(12) United States Patent
Guthrie

(10) Patent No.: US 9,473,754 B2
(45) Date of Patent: Oct. 18, 2016

(54) DYNAMIC LIGHT DISTRIBUTION SYSTEM AND APPARATUS

(71) Applicant: CHRISTIE DIGITAL SYSTEMS USA, INC., Cypress, CA (US)

(72) Inventor: Simon Guthrie, Kitchener (CA)

(73) Assignee: CHRISTIE DIGITAL SYSTEMS USA, INC., Cyprus, CA (US)

( * ) Notice: Subject to any disclaimer, the term of this patent is extended or adjusted under 35 U.S.C. 154(b) by 201 days.

(21) Appl. No.: 14/068,062

(22) Filed: Oct. 31, 2013

(65) Prior Publication Data

US 2015/0116603 A1    Apr. 30, 2015

(51) Int. Cl.
*H04N 9/31* (2006.01)
*G03B 21/14* (2006.01)
*G03B 21/00* (2006.01)
(Continued)

(52) U.S. Cl.
CPC ............ *H04N 9/3182* (2013.01); *G02B 26/02* (2013.01); *G02B 26/0833* (2013.01); *G02B 26/0883* (2013.01); *G03B 21/206* (2013.01); *G03B 21/2066* (2013.01); *H04N 9/3147* (2013.01); *G02B 6/3512* (2013.01); *G02B 6/3528* (2013.01); *G02B 6/3558* (2013.01);
(Continued)

(58) Field of Classification Search
CPC .. H04N 9/3147; H04N 9/3161; H04N 9/315; H04N 9/3126; H04N 9/3152; H04N 9/3155; H04N 9/3158; H04N 9/3164; H04N 9/3167; G03B 21/008; G03B 21/00; G03B 21/20; G03B 21/132; G02B 27/143; G02B 26/0816

USPC ............ 353/30, 31, 69, 94, 34, 82; 348/758
See application file for complete search history.

(56) References Cited

U.S. PATENT DOCUMENTS

| 5,774,604 A | 6/1998 | McDonald |
| 7,015,983 B2 | 3/2006 | Saccomanno |

(Continued)

FOREIGN PATENT DOCUMENTS

| WO | WO 03010568 A1 | 2/2003 |
| WO | WO 2010141148 A1 | 12/2010 |

OTHER PUBLICATIONS

Extended European Search Report (May 4, 2015), issued on Corresponding European Patent Application No. 14191214.7. 7 pages.

*Primary Examiner* — Bao-Luan Le
*Assistant Examiner* — Christopher Lamb, II
(74) *Attorney, Agent, or Firm* — Kristjan Spence; Perry + Currier Inc.

(57) ABSTRACT

A system and apparatus for dynamically distributing light are provided. The apparatus includes a source conduit configured to collect light from a light source and transmit the collected light for emission towards an optical switch. The optical switch is moveable between several discrete resting positions, each corresponding to a different one of a plurality of projector conduits. In each resting position, the optical switch directs light from the source conduit to a corresponding projector conduit. Each projector conduit receives the directed light from the optical switch and transmits the light to a corresponding one of a plurality of projectors. The optical switch is also configured to rest at each of the resting positions for respective portions of a given period of time, to regulate what amount of the light emitted by the source conduit during the period of time is received by each projector conduit.

17 Claims, 6 Drawing Sheets

Figure 1:
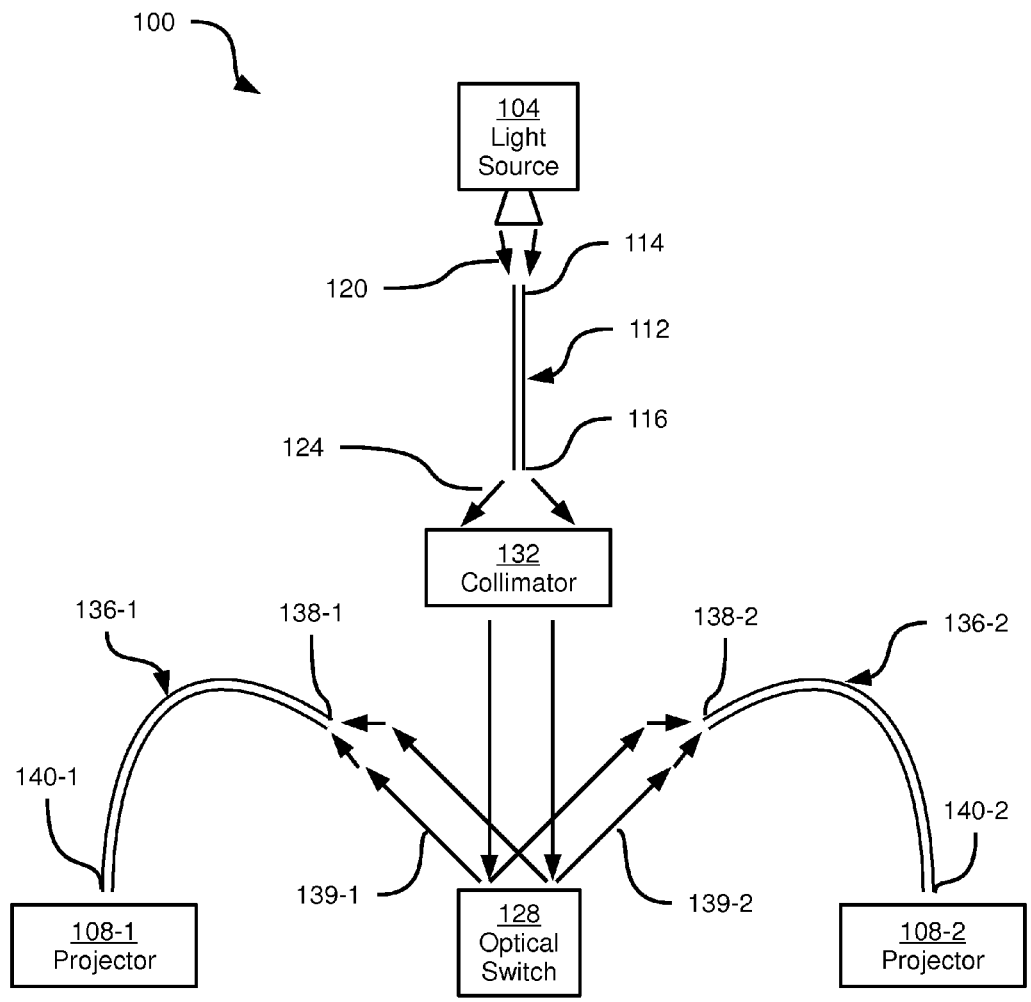

(51) Int. Cl.
  *G02B 26/02* (2006.01)
  *G02B 26/08* (2006.01)
  *G03B 21/20* (2006.01)
  *G02B 6/35* (2006.01)
  *G02B 6/42* (2006.01)
(52) U.S. Cl.
  CPC ........... *G02B6/3574* (2013.01); *G02B 6/3598* (2013.01); *G02B 6/4204* (2013.01)

(56) References Cited

U.S. PATENT DOCUMENTS

| | | | |
|---|---|---|---|
| 7,090,353 B1* | 8/2006 | Bay | 353/31 |
| 2002/0063854 A1 | 5/2002 | Flint | |
| 2003/0012487 A1 | 1/2003 | Hamerly et al. | |
| 2003/0142274 A1* | 7/2003 | Gibbon et al. | 353/31 |
| 2003/0151727 A1* | 8/2003 | Glent-Madsen et al. | 353/94 |
| 2003/0198429 A1* | 10/2003 | Dho | 385/18 |
| 2005/0140568 A1* | 6/2005 | Inazumi | 345/1.3 |
| 2010/0309391 A1* | 12/2010 | Plut | H04N 9/3147 348/756 |
| 2011/0044046 A1* | 2/2011 | Abu-Ageel | 362/259 |
| 2011/0181840 A1* | 7/2011 | Cobb | 353/31 |
| 2013/0169941 A1* | 7/2013 | Kurashige et al. | 353/38 |
| 2013/0250401 A1* | 9/2013 | O'Hara et al. | 359/327 |

\* cited by examiner

DYNAMIC LIGHT DISTRIBUTION SYSTEM AND APPARATUS

FIELD

The specification relates generally to image projection systems, and specifically to a system and apparatus for dynamically distributing light between a plurality of projectors.

BACKGROUND

Projectors with independent light sources (that is, uncorrelated light sources) can be difficult to match in brightness and colorimetry. As a result, images projected by such projectors can appear mismatched. This can become particularly problematic in implementations where the projected images are in tiled arrangements, because mismatches in brightness and colorimetry can become very apparent to viewers due to the close physical proximity of the images. In addition, variations in brightness and contrast needs for the various projectors can be difficult to satisfy, thus negatively impacting the quality of the projected images.

SUMMARY

According to an aspect of the specification, a dynamically adjustable light distribution apparatus is provided, comprising: a source conduit having a first end and a second end, and configured to collect light at the first end from a light source and transmit the collected light for emission at the second end; an optical switch switchable between a plurality of discrete resting states each corresponding to a different one of a plurality of projector conduits; the optical switch configured, in each one of the discrete resting states, to direct the light emitted from the source conduit to a corresponding one of the projector conduits; each projector conduit configured to receive the directed light from the optical switch and transmit the directed light to a corresponding one of a plurality of projectors; the optical switch further configured, in a period of time, to rest at each of the discrete resting states for respective portions of the period of time, to regulate what amount of the light emitted by the source conduit during the period of time is received by each projector conduit.

According to another aspect of the specification, a computing device is provided, comprising: a memory; a communications interface connecting the computing device to an optical switch having a plurality of discrete resting states, each resting state for directing light emitted from a light source to a corresponding one of a plurality of projectors; and a processor interconnected with the memory and the communications interface, and configured to: retrieve light distribution settings from the memory, the light distribution settings specifying portions of a total output of the light source to be directed to each of the plurality of projectors; determine, based on the portions, operational parameters for the optical switch; and control the optical switch to direct light to the projectors according to the portions by transmitting the operational parameters to the optical switch via the communications interface.

BRIEF DESCRIPTIONS OF THE DRAWINGS

Figure 2A:
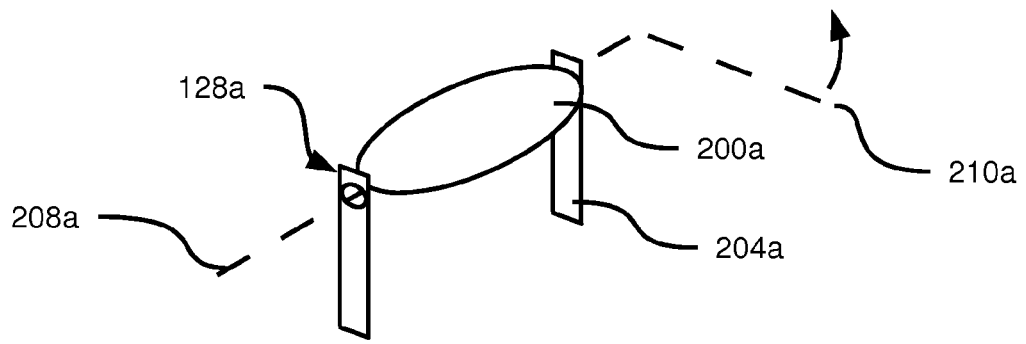
Figure 2B:
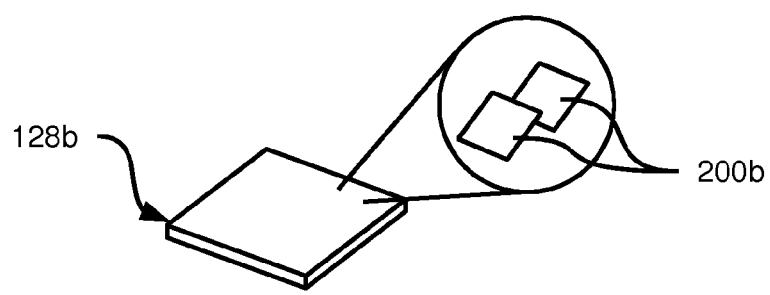
Figure 2C:
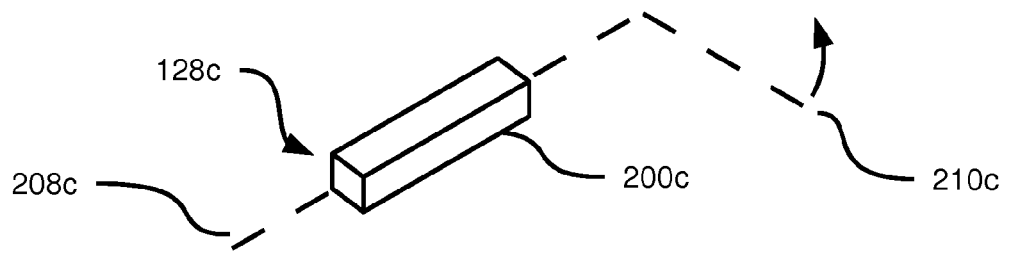
Figure 3:
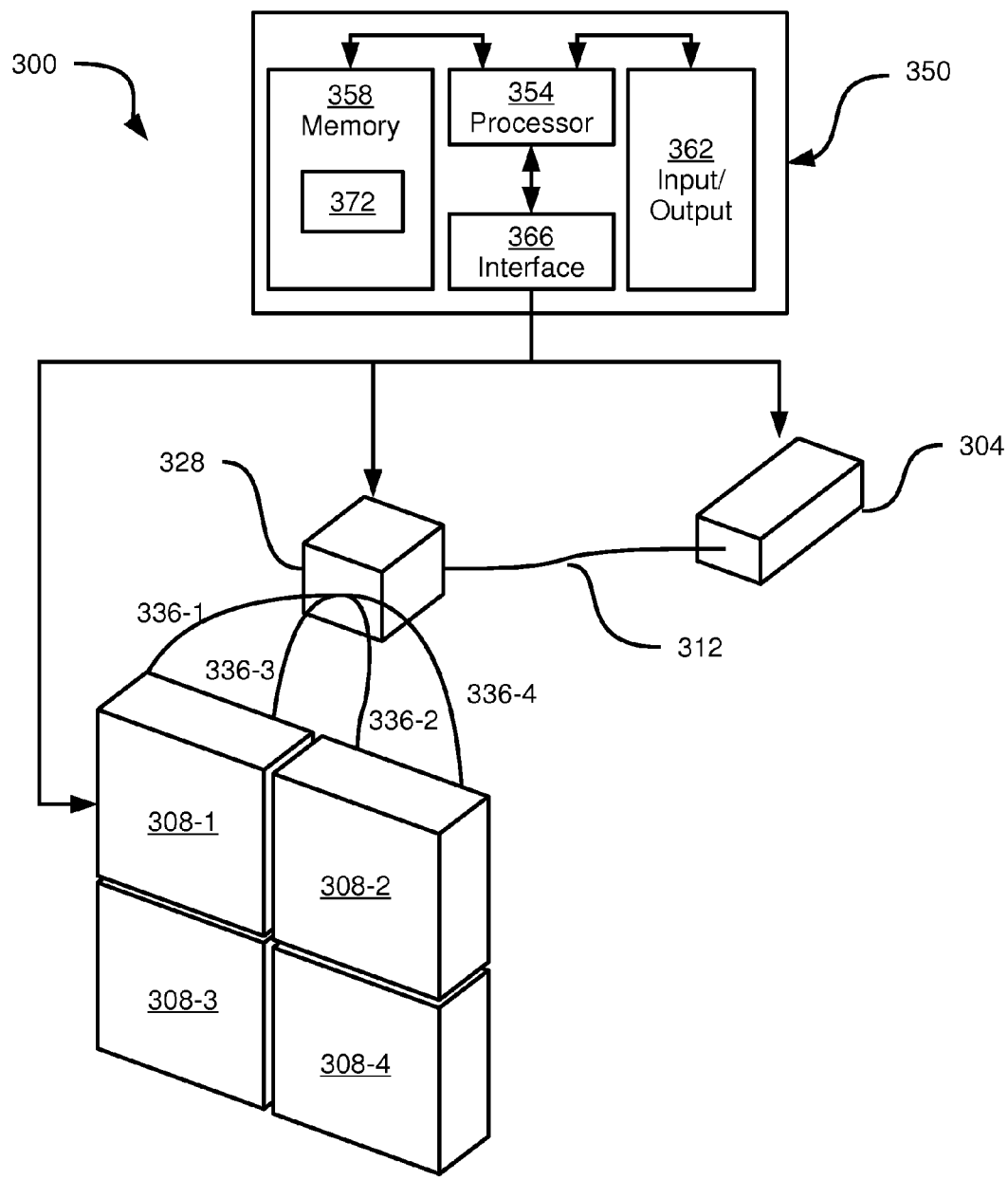
Figure 4A:
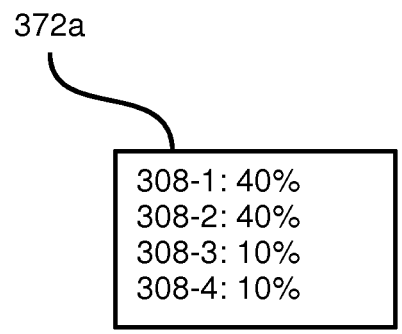
Figure 4B:
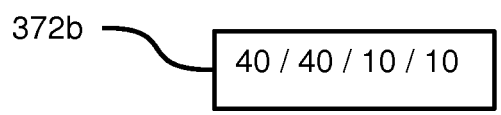
Figure 4C:
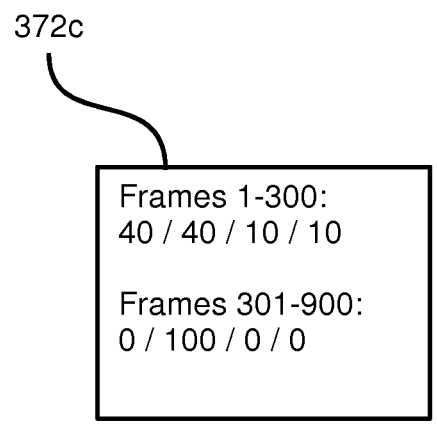
Figure 5:
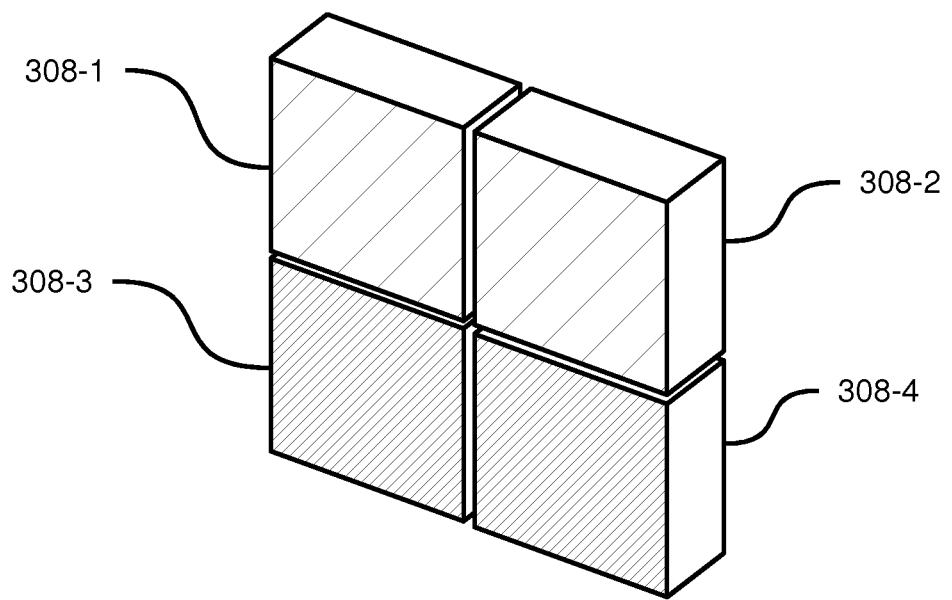
Figure 6:
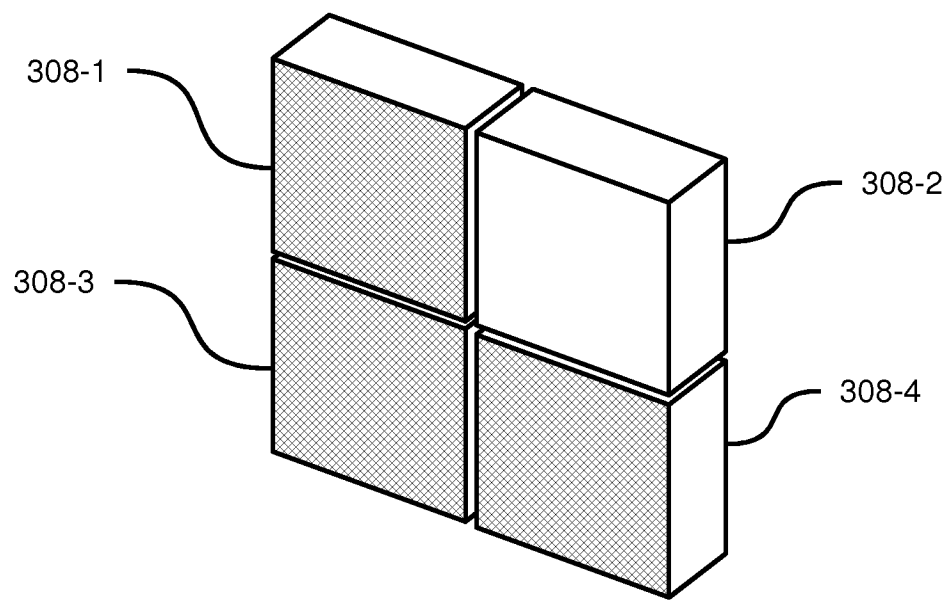

Embodiments are described with reference to the following figures, in which:

FIG. 1 depicts a system for dynamically distributing light, according to a non-limiting embodiment;

FIGS. 2A, 2B, and 2C depict example optical switches of the system of FIG. 1, according to a non-limiting embodiment;

FIG. 3 depicts a system for dynamically distributing light, according to another non-limiting embodiment;

FIGS. 4A, 4B, and 4C depict example light distribution settings of the system of FIG. 3, according to a non-limiting embodiment;

FIG. 5 depicts the projectors of the system of FIG. 3 controlled according to the settings of FIGS. 4A and 4B, according to a non-limiting embodiment; and FIG. 6 depicts the projectors of the system of FIG. 3 controlled according to the settings of FIGS. 4C, according to a non-limiting embodiment.

DETAILED DESCRIPTION OF THE EMBODIMENTS

FIG. 1 depicts a system 100 for dynamically distributing light.

Specifically, system 100 includes an apparatus for distributing light emitted by a light source 104 between a plurality of projectors 108-1, 108-2 (referred to collectively as projectors 108, and generically as a projector 108). Although two projectors 108 are shown, it is contemplated that more than two projectors can also be provided.

The nature of light source 104 and projectors 108 are not particularly limited. Light source 104 can thus be any suitable light source, such as a xenon arc lamp, a laser light source, a Light Emitting Diode (LED) light source, or the like. Light source 104 can also include more than one of the above-mentioned sources, or a combination of such sources. Each one of projectors 108-1 and 108-2, meanwhile, can be any of a wide variety of projector types, albeit without internal light sources of their own. For example, projectors 108 can be any one of, or any suitable combination of, a liquid crystal display (LCD) projector, a digital light processing (DLP) projector or the like.

The apparatus for distributing light from light source 104 between projectors 108 includes a source conduit 112 with a first end 114 and a second end 116. First end 114 of conduit 112 is positioned so as to collect light 120 emitted by light source 104, and conduit 112 transmits the collected light for emission, as emitted light 124, at second end 116. Conduit 112 can be, for example, a fibre optic line (e.g. a bundle of optical fibres) of any suitable length, and can include any necessary optics at first end 114 for collecting light from light source 104. Alternatively, such optics (e.g. a focusing lens) can be included in light source 104. In some embodiments, rather than a bundle of fibres, conduit 112 can be a single solid rod, a hollow rod, or a channel of air.

The light emitted by source conduit 112 is received by an optical switch 128. In the present example, before being received by optical switch 128, emitted light 124 passes through a collimator 132 to collimate emitted light 124. Additional optical elements can be included between second end 116 and collimator 132, or between collimator 132 and optical switch 128, or both. For example, such additional optical elements can include filters, integrator rods, relay lenses, and the like. Collimator 132 and any additional optical elements can be omitted in some embodiments.

As will be discussed in greater detail below, having received the light emitted from source conduit 112, optical switch 128 directs the light to a plurality of projector conduits each corresponding to one of projectors 108. Thus, in the present example, optical switch 128 directs the light to a first projector conduit 136-1 corresponding to projector 108-1, and to a second projector conduit 136-2 corresponding to projector 108-2. As will become apparent in the detailed discussion of optical switch 128 to follow, in the present example optical switch 128 does not direct light to both projector conduits 136 simultaneously, but instead directs light to one projector conduit 136 at a time. Certain other example embodiments, as will be discussed later herein, are capable of simultaneously directing light to more than one projector conduit.

Projector conduits 136-1 and 136-2 (referred to collectively as projector conduits 136, and generically as a projector conduit 136) can be fibre optic lines of any suitable lengths (projector conduit 136-1 need not have the same length as projector conduit 136-2). As mentioned in connection with conduit 112, projector conduits 136 can also be provided by solid or hollow rods, or by channels of air. Each projector conduit 136 has a first end (138-1 and 138-2) for collecting directed light (139-1 and 139-2) from optical switch 128, and transmits the collected light to a second end (140-1 and 140-2) for delivery to the respective one of projectors 108. Optical elements such as focusing lenses (not shown) can be provided at first ends 138 and second ends 140 for collecting directed light 139 and for delivering the light to projectors 108.

Turning now to FIGS. 2A, 2B and 2C, optical switch 128 will be discussed in greater detail. In general, a light-directing portion of optical switch 128 is capable of switching between a plurality of discrete resting states. Optical switch 128 can thus switch between any two resting states, and can remain in any one of the resting states for a configurable period of time before switching to another resting state. The resting positions are referred to as "discrete" due to the above-mentioned ability of optical switch 128 to rest, or park, in a given state, rather than transitioning continuously through the states.

Each resting state of optical switch 128 corresponds to a different one of projector conduits 136. In each of the resting states, optical switch 128 directs light received from source conduit 112 towards the corresponding one of projector conduits 136. In other words, each projector conduit 136 is located so as to collect light from optical switch 128 only when optical switch 128 is parked in the resting state corresponding to that projector conduit. Returning briefly to FIG. 1, assume that optical switch 128 has two resting states: a first state corresponding to projector conduit 136-1, and a second state corresponding to projector conduit 136-2. When optical switch 128 is parked in the first state, light received from source conduit 112 is directed towards projector conduit 136-1 as directed light 139-1. Projector conduit 136-2, meanwhile, is dark (i.e. does not receive any light from optical switch 128). When optical switch 128 switches away from the first states and parks in the second state, however, light received from source conduit 112 is directed to projector conduit 136-2 as directed light 139-2, and projector conduit 136-1 goes dark (i.e. stops receiving light from optical switch 128).

Returning to FIGS. 2A-2C, various implementations of optical switch 128 are contemplated. In the examples to be discussed in detail below, the light-directing portion of optical switch 128 is actually moveable, and the above-mentioned states are represented by specific physical positions of the light-directing portion. Thus, in the discussion below the resting states are referred to as resting positions, and the optical switch is described as being moveable between resting positions (and, as noted above, capable of parking at each discrete resting position).

In FIG. 2A, a first example optical switch 128a is shown. Optical switch 128a includes a movable light-directing portion in the form of a mirror 200a. The shape of mirror 200a is not particularly limited, despite being shown as an elliptical mirror in FIG. 2A. Mirror 200a has a reflective surface area that is sufficiently large to capture all of the light received at optical switch 128 from source conduit 112. Mirror 200a is suspended by a support structure 204a, such as a gimbal or a set of gimbals, which allows mirror 200a to rotate about an axis 208a. Where a set of gimbals are used, or indeed any other support structure allowing multiple degrees of freedom in the motion of mirror 200a, mirror 200a can move not only about axis 208a, but about other axes (not shown) as well.

The discrete resting positions of optical switch 128a are defined by different angles of rotation of mirror 200a about axis 208a. For example, the rotation of mirror 200a can be driven by one or more servomotors, which can be configured to stop rotation at a plurality of preconfigured angles, with reference to a preset zero angle 210a. As a result, each discrete resting position corresponds to a different angle of the surface of mirror 200a in relation to preset zero angle 210a. Light received from source conduit 112 is therefore reflected by mirror 200a in a different direction in each resting position.

FIG. 2B depicts another example optical switch 128b. Optical switch 128b is a digital micromirror device (DMD). As will now be apparent to those skilled in the art, the movable light-directing portion of optical switch 128b is provided by an array of micromirrors 200b (two of which are shown in the magnified inset of FIG. 2B), which can be mounted on torsion hinges or other suitable mechanisms. Each micromirror 200b can be moved between one of two angles and parked at each angle. Each micromirror 200b can also be moved independently of the other micromirrors in the array. The discrete resting positions of optical switch 128b are determined by the two resting angles of micromirrors 200b. More specifically, in one resting position, the entire array of micromirrors 200b is placed in one of the angles, and in the other resting position, the entire array is placed in the other angle. More than two discrete resting positions can be provided by chaining together more than one DMD in one or more series of DMDs. For example, an optical switch can include three DMDs (not shown), the first of which directs light from source conduit 112 to either the second DMD or the third DMD. The second and third DMDs, in turn, direct light between a total of four projector conduits 136. Thus, one discrete resting position for the optical switch as a whole is defined by the combination of angles of all three DMDs.

Referring now to FIG. 2C, another example optical switch 128c is shown. Optical switch 128c includes a movable light-directed portion in the form of a prism 200c, which can be rotated about an axis 208c, for example by one or more servomotors. Although prism 200c is shown as a rectangular prism, a wide variety of prisms can be used instead of a rectangular prism. In addition, as discussed in connection with optical switch 128a, multi-axis motion is also contemplated. That is, prism 200c can be configured to rotate about more than one axis to provide a greater variety of resting positions. In the present example, the discrete resting positions of prism 200c are defined by the angle of rotation of prism 200c in relation to a preset zero angle 210c, similarly to the resting positions of mirror 200a discussed earlier.

References to optical switch 128 hereafter will be understood to be a reference to any one of, or any combination of, the examples discussed in connection with FIGS. 2A-2C.

It will now be apparent that optical switch 128 can be used to control how much of the light emitted by light source 104 reaches each projector conduit 136. Specifically, optical switch 128 can be configured, in a given period of time, to rest at each of the discrete resting positions for configurable portions of the period of time. Because optical switch 128 directs light to a different projector conduit 136 in each resting position, the amount of time optical switch 128 spends in each resting position determines what proportion of the total light output of light source 104 is directed to the projector conduit 136 (and thus the corresponding projector 108) corresponding to that resting position.

A variety of mechanisms are contemplated for controlling the movement of optical switch 128 and the amount of time optical switch 128 spends in each discrete resting position. Examples of such control mechanisms will be discussed in connection with FIG. 3.

FIG. 3 depicts a variation of system 100 in the form of a system 300. System 300 includes a light source 304 which is as described above in connection with light source 104. System 300 also includes four projectors 308-1, 308-2, 308-3 and 308-4 assembled in a tiled arrangement. Each projector 308 can be, for example, a rear-projection unit without an independent light source. System 300 also includes an optical switch 328 as described above in connection with optical switch 128. A source conduit 312 (similar to source conduit 112) carries light from light source 304 to optical switch 328, and projector conduits 336-1, 336-2, 336-3 and 336-4 each carry light from optical switch 328 to a respective projector 308. A collimator and other optical elements are not shown, but can be included between optical switch 328 and projectors 308.

Light source 304, projectors 308, and optical switch 328 are connected to, and controlled by, a computing device 350. Computing device 350 can be based on any suitable server or personal computer environment, or can be provided as a card within any suitable server or personal computer. In the present example, computing device 350 is a desktop computer housing various components, including a central processing unit, or processor, 354. Processor 354 is interconnected with a non-transitory computer readable storage medium such as a memory 358. Memory 358 can be any suitable combination of volatile memory (e.g. Random Access Memory (RAM)) and non-volatile memory (e.g. flash memory, magnetic discs and the like). Processor 354 is also interconnected with any suitable combination of input and output devices 362, such as a keyboard, a mouse, and a display. Processor 354 is further interconnected with a communications interface 366. Interface 366 allows computing device 350 to communicate with other devices (such as optical switch 128), and can be based on a wide variety of communications technologies. For example, interface 366 can include the necessary hardware to connect to other devices over one or more of a Universal Serial Bus (USB) connection, an Ethernet connection, or a wireless connection (e.g. Wi-Fi).

Processor 354 is configured to perform various functions via the execution of computer readable instructions (also referred to as applications) stored in memory 358. In the discussion below, when processor 354 or computing device 350 is said to perform an action, or to be configured to perform an action, it will be understood that such actions are performed as a result of processor 354 executing instructions stored in memory 358.

Memory 358 also stores light distribution settings 372, for use in controlling optical switch 328. Memory 358 can also store settings, applications and other data (e.g. image and video files) for use in controlling light source 304 and projectors 308. The control of light source 304 and projectors 308, however, will not be discussed in detail herein, as such control is performed according to conventional techniques. The control of optical switch 328 will be set out in detail below.

As discussed earlier, optical switch 328 can be used to control how much of the output of light source 304 is directed to each projector 308 during a given time period by spending specific portions of that time period in the discrete resting positions corresponding to each projector 308. Computing device 350 is configured to determine the length of time that optical switch 328 spends in each resting position, and to communicate the required resting times to optical switch 328. The determination of resting times at computing device 350 is based on light distribution settings 372.

Turning to FIGS. 4A, 4B and 4C, examples of settings 372 are shown. FIG. 4A illustrates a relatively simple setting 372a, in which each one of projectors 308 is assigned a percentage of the output of light source 304. Thus, in settings 372a, projectors 308-1 and 308-2 each receive 40% of the output of light source 304, while projectors 308-3 and 308-4 each receive 10% of the output. As a result, the total output (100%) of light source 304 is divided among projectors 308.

Settings 372 can be received at computing device 350 in a variety of ways. For example, computing device 350 can control input/output devices 362 to present a user interface with fillable fields or other elements, and receive input data comprising values each representing a fraction of light source 304's output to be directed to each projector 308. Having received such input, processor 354 can save the values in settings 372.

The format shown in FIG. 4A is not intended to be limiting. Indeed, a wide variety of formats can be used to store the values. For example, FIG. 4B depicts another example settings 372b in which projectors 308 are not explicitly identified. Instead, the fractions assigned to each projector 308 are stored in a predefined order known to processor 354.

In order to control optical switch 328, processor 354 retrieves settings 372 from memory, and based on the values therein, determines operational parameters for optical switch 328. Optical switch 328 can be controlled using techniques similar to pulse width modulation (PWM). For example, optical switch 328 may be capable of switching between resting positions at a frequency of 120 Hz. Thus, the shortest period of time that optical switch 328 can spend in any one position is 1/120s (in practice, this will be somewhat shorter to account for the settling time between positions). Computing device 350 can therefore instruct optical switch 328 to divide the one hundred and twenty available periods in each second between the resting positions according to settings 372. In the present example, therefore, computing device 350 can instruct optical switch 328 to spend 48 available periods each second in the resting position corresponding to projector 308-1, 48 available periods in the resting position corresponding to projector 308-2, 12 available periods in the resting position corresponding to projector 308-3, and 12 available periods in the resting position corresponding to projector 308-4. A wide variety of other control schemes are also possible (for example, computing device 350 can send switching frequencies, or exact switching times, to optical switch 328), and optical switch 328 is not limited to a switching frequency of 120 Hz. Indeed, in many applications significantly higher frequencies may be desirable. DMDs, for example, can be capable of switching at frequencies of greater than 10 kHz.

Turning to FIG. 5, the result of controlling optical switch 328 according to settings 372a or 372b are shown. In particular, projectors 308-1 and 308-2 are brighter (as illustrated by less-dense hatching), while projectors 308-3 and 308-4 are darker (as illustrated by denser hatching). Note that the illustrated brightness of each projector 308 in FIG. 5 refers to the maximum brightness achievable by each projector 308. Depending on the nature of the projected images, each projector 308 may appear darker than in FIG. 5 as a result of using only a portion of its maximum output.

Returning to FIG. 4C, a more complex example settings 372c is shown. In the present example settings 372c specify different light distributions for different periods of time. In particular, settings 372c are associated with a video file to be played by projectors 308. Settings 372c thus include different light distribution settings for different portions of the video file. Thus, for the first three hundred frames of the video, the distribution is as seen in FIG. 5. For the next six hundred frames, however, the distribution is adjusted to direct all light to projector 308-2. Computing device 350 is thus configured to compare settings 372c to a current time or a current frame of the video being played, and to update the operational parameters of optical switch 328 when necessary.

Referring to FIG. 6, when the three hundredth frame of the video has been displayed, computing device 350 updates the control of optical switch 328 to direct all available light to projector 308-2, leaving no light for the remaining projectors 308. For example, computing device 350 can transmit an instruction to optical switch 128 to spend all available periods for each second in the resting position corresponding to projector 308-2. The result is that projector 308-2 is brighter than in FIG. 5, while projectors 308-1, 308-3 and 308-4 are darker.

It is also contemplated that in some embodiments, computing device 350 can automatically determine settings 372. For example, if a video or image file indicates that image data is to be projected by one of projectors 308, while no image data is to be projected by the other projectors 308 (for example, some frames of a video may be black except for a small portion in one corner of the frame), computing device 350 can automatically adjust settings 372 to direct more light to the one projector 308 and less light to the others.

Further examples of optical switch 128 are also contemplated. For example optical switch 128 can be an acousto-optic modulator, in which acoustic waves are generated in a crystal for directing light passing through the crystal. The state of optical switch 128 can therefore be switched by modifying the characteristics of the acoustic waves. In contrast to the examples provided in FIGS. 2A-2C, such an optical switch does not have discrete resting positions, as no moving parts are necessary. Rather, discrete resting states are provided by the varying acoustic waves.

In additional variations, as mentioned earlier, optical switch 128 can be configured to direct light from light source 104 to more than one projector conduit 136 simultaneously. In other words, optical switch 128 can be in more than one resting state at the same time. Such functionality can be achieved, for example, by the use of a DMD, in which different portions of the micromirrors can be aimed different projector conduits 136.

Those skilled in the art will appreciate that in some embodiments, the functionality of computing device may be implemented using pre-programmed hardware or firmware elements (e.g., application specific integrated circuits (ASICs), electrically erasable programmable read-only memories (EEPROMs), etc.), or other related components.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A dynamically adjustable light distribution apparatus, comprising:
    a source conduit having a first end and a second end, and configured to collect light at the first end from a light source and transmit the collected light for emission at the second end;
    an optical switch switchable between a plurality of discrete resting states each corresponding to a different one of a plurality of projector conduits; the optical switch configured, in each one of the discrete resting states, to receive the light emitted from the source conduit and to direct all the received light to a single corresponding one of the projector conduits without directing light to the remaining projector conduits, such that the remaining projector conduits receive substantially no light;
    each projector conduit configured to receive the directed light from the optical switch and transmit the directed light to a corresponding one of a plurality of projectors;
    the optical switch further configured to receive operational parameters from a computing device for controlling a maximum brightness of each of the projectors; the operational parameters defining, for each of the discrete resting states, a corresponding portion of a period of time proportional to the maximum brightness; at least two of the portions being unequal;
    the optical switch further configured, in the period of time, to rest at each of the discrete resting states for the corresponding portion of the period of time defined by the operational parameters, to regulate the maximum brightness of each projector according to the amount of the light emitted by the source conduit during the period of time and received by each projector conduit.

2. The apparatus of claim 1, further comprising a collimator disposed between the second end of the source conduit and the optical switch.

3. The apparatus of claim 1 wherein the source conduit and the projector conduits each comprise an optical fiber.

4. The apparatus of claim 1, the optical switch comprising a single mirror movable about at least one axis, such that the discrete resting states are provided by a plurality of discrete resting positions of the mirror.

5. The apparatus of claim 1, the optical switch comprising a first digital micromirror device (DMD).

6. The apparatus of claim 5, the optical switch including an additional DMD in series with the first DMD.

7. The apparatus of claim 1, further comprising at least one of an integrator rod, a relay lens assembly, and a filter disposed between the second end of the source conduit and the optical switch.

8. The apparatus of claim 1, further comprising a plurality of focusing lenses each corresponding to a different one of the resting positions, each focusing lens disposed between the optical switch and the corresponding projector conduit.

9. The apparatus of claim 1 wherein the light source is a laser.

10. The apparatus of claim 1 wherein the projectors are assembled for projecting images in a tiled arrangement.

11. The apparatus of claim 1, the optical switch comprising an acousto-optic modulator.

12. A computing device comprising:
a memory;
a communications interface connecting the computing device to an optical switch having a plurality of discrete resting states, each resting state for receiving light emitted from a light source and directing all the received light to a single corresponding one of a plurality of projectors without directing light to the remaining projector conduits, such that the remaining projector conduits receive substantially no light; and
a processor interconnected with the memory and the communications interface, and configured to:
retrieve light distribution settings from the memory, the light distribution settings specifying, for each of the plurality of projectors, a corresponding portion of a total output of the light source to be directed to the projector by the optical switch for controlling a maximum brightness of each of the projectors; at least two of the portions being unequal;
determine, based on the portions, operational parameters for the optical switch; and
control the optical switch to direct light to the projectors according to the portions and thereby regulate the maximum brightness of each projector by transmitting the operational parameters to the optical switch via the communications interface.

13. The computing device of claim 12, wherein the portions are specified in the light distribution settings as percentages of the total output of the light source.

14. The computing device of claim 12, the communications interface further connecting the computing device to each of the projectors, and the memory storing image data for transmission to the projectors;
the light distribution settings specifying more than one set of portions, each set corresponding to a different section of the image data;
the processor further configured to:
transmit one of the sections of the image data to the projectors; and
control the optical switch by transmitting the portions from one of the sets based on which section of the image data was transmitted to the projectors.

15. The computing device of claim 14, wherein the image data comprises a video file, and wherein each section of the image data includes a plurality of frames in the video file.

16. The computing device of claim 12, wherein the operational parameters comprise at least one frequency parameter.

17. The computing device of claim 12, wherein the optical switch comprises a digital micromirror device (DMD) having a plurality of micromirrors, and wherein the operational parameters comprise percentages of the micromirrors to be directed towards each projector.

* * * * *